(12) United States Patent
Bower et al.

(10) Patent No.: US 9,124,654 B2
(45) Date of Patent: Sep. 1, 2015

(54) FORMING A FEDERATED SYSTEM WITH NODES HAVING GREATEST NUMBER OF COMPATIBLE FIRMWARE VERSION

(71) Applicant: International Business Machines Corporation, Armonk, NY (US)

(72) Inventors: Fred A. Bower, Durham, NC (US); Shunrong Hu, Shanghai (CN); William G. Pagan, Durham, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 222 days.

(21) Appl. No.: 13/713,016

(22) Filed: Dec. 13, 2012

(65) Prior Publication Data

US 2014/0075173 A1    Mar. 13, 2014

Related U.S. Application Data

(63) Continuation of application No. 13/610,939, filed on Sep. 12, 2012, now abandoned.

(51) Int. Cl.
*G06F 9/44* (2006.01)
*H04L 29/08* (2006.01)

(52) U.S. Cl.
CPC .............. *H04L 67/34* (2013.01); *G06F 9/4401* (2013.01)

(58) Field of Classification Search
CPC ........ G06F 9/06; G06F 9/4401; G06F 9/4406
USPC ............................................................ 713/2
See application file for complete search history.

(56) References Cited

U.S. PATENT DOCUMENTS

| | | | | |
|---|---|---|---|---|
| 5,854,896 A * | 12/1998 | Brenner et al. | ............... | 709/221 |
| 6,401,120 B1 * | 6/2002 | Gamache et al. | ............ | 709/226 |
| 6,449,641 B1 * | 9/2002 | Moiin et al. | ................. | 709/220 |
| 6,453,426 B1 * | 9/2002 | Gamache et al. | ........... | 714/4.21 |
| 6,826,750 B1 * | 11/2004 | Curtis et al. | .................. | 717/170 |
| 6,862,613 B1 * | 3/2005 | Kumar et al. | ................. | 709/220 |
| 6,957,331 B2 * | 10/2005 | Kursawe et al. | ............. | 713/163 |
| 7,146,609 B2 | 12/2006 | Thurston et al. | | |
| 7,177,950 B2 * | 2/2007 | Narayan et al. | .............. | 709/248 |
| 7,180,851 B1 * | 2/2007 | Engel et al. | .................. | 370/216 |
| 7,260,818 B1 * | 8/2007 | Iterum et al. | ................. | 717/170 |
| 7,328,434 B2 | 2/2008 | Swanson et al. | | |
| 7,464,378 B1 * | 12/2008 | Limaye et al. | ................ | 718/100 |
| 7,466,659 B1 * | 12/2008 | Kazar et al. | .................. | 370/252 |
| 7,543,046 B1 * | 6/2009 | Bae et al. | ...................... | 709/220 |
| 7,734,960 B2 * | 6/2010 | Mandal | ........................... | 714/43 |
| 7,809,836 B2 | 10/2010 | Mihm et al. | | |
| 7,870,230 B2 * | 1/2011 | Rao et al. | ..................... | 709/220 |
| 7,987,152 B1 * | 7/2011 | Gadir | ............................. | 707/602 |
| 8,001,222 B2 * | 8/2011 | Beck | .............................. | 709/221 |

(Continued)

*Primary Examiner* — Thomas Lee
*Assistant Examiner* — Santosh R Poudel
(74) *Attorney, Agent, or Firm* — Katherine S. Brown; Jeffrey L. Streets (57) ABSTRACT

A method initializes a federated computer system from a fabric of nodes connected by a federated interface. Each node casts a vote to the federated interface for a candidate firmware version supported by the node casting the vote. The candidate firmware version having received the greatest number of votes is identified, and the computer system is initialized as a federated system of the nodes that support the firmware version identified as having received the greatest number of votes. A process of iterative voting may be used to identify a greater number of nodes supporting a compatible firmware version.

18 Claims, 5 Drawing Sheets

(56) References Cited

U.S. PATENT DOCUMENTS

| | | | |
|---|---|---|---|
| 8,312,548 B1* | 11/2012 | Cnudde et al. | 726/24 |
| 8,443,062 B2* | 5/2013 | Voutilainen et al. | 709/221 |
| 8,516,470 B1* | 8/2013 | van Rietschote et al. | 717/168 |
| 8,560,646 B1* | 10/2013 | Sivasubramanian et al. | 709/220 |
| 8,639,724 B1* | 1/2014 | Sorenson et al. | 707/796 |
| 2002/0161821 A1* | 10/2002 | Narayan et al. | 709/201 |
| 2003/0023680 A1* | 1/2003 | Shirriff | 709/204 |
| 2004/0254984 A1* | 12/2004 | Dinker | 709/205 |
| 2005/0132154 A1* | 6/2005 | Rao et al. | 711/162 |
| 2006/0080574 A1* | 4/2006 | Saito et al. | 714/11 |
| 2006/0090095 A1* | 4/2006 | Massa et al. | 714/4 |
| 2006/0184627 A1* | 8/2006 | Howell et al. | 709/205 |
| 2007/0083625 A1 | 4/2007 | Chamdani et al. | |
| 2007/0214314 A1* | 9/2007 | Reuter | 711/114 |
| 2007/0294363 A1* | 12/2007 | Friedrich et al. | 709/217 |
| 2008/0040628 A1* | 2/2008 | Mandal | 714/4 |
| 2008/0183973 A1* | 7/2008 | Aguilera et al. | 711/147 |
| 2008/0184061 A1* | 7/2008 | Tripathi et al. | 714/4 |
| 2008/0250421 A1* | 10/2008 | Basavaraja et al. | 718/105 |
| 2008/0288646 A1* | 11/2008 | Hasha et al. | 709/228 |
| 2008/0310097 A1 | 12/2008 | Sherrod et al. | |
| 2009/0063582 A1* | 3/2009 | Anna et al. | 707/203 |
| 2009/0144720 A1* | 6/2009 | Roush et al. | 717/171 |
| 2009/0276481 A1* | 11/2009 | Anna et al. | 709/201 |
| 2010/0169446 A1* | 7/2010 | Linden et al. | 709/206 |
| 2010/0169876 A1 | 7/2010 | Mann | |
| 2011/0106774 A1* | 5/2011 | Wickremesinghe et al. | 707/695 |
| 2011/0106886 A1 | 5/2011 | Nolterieke et al. | |
| 2011/0173302 A1* | 7/2011 | Rider | 709/220 |
| 2012/0102199 A1* | 4/2012 | Hopmann et al. | 709/226 |
| 2012/0102481 A1* | 4/2012 | Mani et al. | 717/172 |
| 2012/0144197 A1* | 6/2012 | Chung et al. | 713/169 |
| 2013/0166863 A1* | 6/2013 | Buragohain et al. | 711/162 |
| 2013/0275626 A1* | 10/2013 | Kim et al. | 709/248 |

\* cited by examiner

FORMING A FEDERATED SYSTEM WITH NODES HAVING GREATEST NUMBER OF COMPATIBLE FIRMWARE VERSION

CROSS-REFERENCE TO RELATED APPLICATIONS

This application is a continuation of co-pending U.S. patent application Ser. No. 13/610,939, filed on Sep. 12, 2012.

BACKGROUND OF THE INVENTION

1. Field of the Invention

The present disclosure relates to federated computer systems and methods for initializing a federated computer system.

2. Background of the Related Art

A data center is a facility where computer equipment and related infrastructure are consolidated for centralized operation and management. Computer equipment may be interconnected in a datacenter to produce large, powerful computer systems that are capable of storing and processing large amounts of data for entities such as large corporations, web hosting services, and Internet search engines. A data center may house any number of racks, each capable of holding a large number of servers and supporting equipment, such as switches, power supplies, network communications interfaces, environmental controls, and security devices. Servers and supporting equipment are typically housed in rack-mounted, multi-server enclosures (e.g. a multi-blade chassis) and arranged in a high-density configuration. This type of arrangement uses space efficiently while providing physical access to the equipment and enabling the circulation of cool air. As many servers and rack-mounted enclosures as needed may be interconnected to produce a system having the desired performance.

A federated computer system involves multiple nodes interconnected to form a larger computer system. A federated computer system also requires the use of multiple firmware images, with one set of firmware per node. The multiple sets of firmware are responsible for coordinating an initial sequencing of the federated system. In order to properly coordinate this sequencing, the sets of firmware must be compatible or match. Firmware for each server or node in a federated computer system may be periodically flash updated. When a node fails to be updated with its peers, such as through user error or a firmware update process failure, the system may no longer be able to initialize in the federated configuration. The conventional response to such a failure is either to simply stop the initialization and emit an error from all nodes or to initialize each node as an independent system in a non-federated configuration.

BRIEF SUMMARY OF THE INVENTION

A computer-implemented method is described for initializing a federated computer system from a fabric of nodes connected by a federated interconnect interface. In one embodiment, each node casts a vote to the interconnect interface for a candidate firmware version that is supported by the node casting the vote. The voting results may be examined to identify the candidate firmware version having received the greatest number of votes. The computer system may be initialized as a federated computer system of the nodes that support the firmware version identified as having received the greatest number of votes. Programming code for performing the method may be embodied in the form of computer usable program code on a non-transient computer usable storage medium.

DETAILED DESCRIPTION OF THE INVENTION

A computer-implemented method is described for initializing a federated computer system from a fabric of nodes connected by a federated interconnect interface. In one embodiment, each node casts a vote to the interconnect interface for a candidate firmware version that is supported by the node casting the vote. The voting results may be examined to identify the candidate firmware version having received the greatest number of votes. The computer system may be initialized as a federated computer system of the nodes that support the firmware version identified as having received the greatest number of votes. Programming code for performing the method may be embodied in the form of computer usable program code on a non-transient computer usable storage medium.

A computer system is also described, for self-initializing as a federated system. A plurality of nodes is interconnected by a federated interface to form a fabric. The federated interface comprises high-speed links providing functional connections from each node to every other node in the fabric. Each node comprises control logic for casting a vote to the federated interface for a candidate firmware version supported by the node casting the vote, identifying the candidate firmware version receiving the greatest number of votes, and initializing the computer system as a federated system including only the nodes that support the firmware version identified as receiving the greatest number of votes.

Systems and methods are disclosed for initializing a federated computer system from among a plurality of nodes interconnected on a federated interface, even when not all of the nodes on the federated interface have compatible firmware versions. For purposes of this disclosure, a node comprises any group of compute resources to be initialized from a single firmware set prior to federation. The minimum set of firmware elements necessary to initialize the nodes as a federated system may differ in different federated system architectures. For example, the Basic Input-Output System (BIOS) firmware may need to be at the same functional level, while the Ethernet firmware may not. The physical packaging of the computer system may comprise a plurality of hardware enclosures with physical connectors for interconnecting the enclosures, typically using a set of system fabric cables. This physical packaging is generally independent of the logical construct of a node, other than that establishing the logical connections between nodes relies on some sort of inter-enclosure connection capability. Therefore, each enclosure may be configured as a single node, multiple nodes, or part of a node.

Each node may be capable of supporting multiple different firmware versions. The choice of firmware version used for initialization determines which nodes may participate in the federated system. In one application, a low-level wire protocol is used to communicate firmware version information between nodes for the purpose of identifying nodes having compatible sets of firmware necessary for initialization of a federated system. "Compatible sets of firmware" refers to the minimum set of firmware elements that must be matched for federation to be supported. This approach can be used to obtain the optimal configuration from the available nodes, such as to obtain the largest-possible federated system in terms of the number of nodes participating in the federated system. A primary federated system may be determined according to a subset of nodes that support the highest firmware version to have received more than one vote. The remaining nodes may be used to create one or more additional, smaller federated systems within their peer groups that have compatible firmware versions. The nodes outside of the primary federated system can alternatively be initialized in a non-federated mode of operation and sent into a flash update sequence per customer policy. By utilizing the low-level wire protocol on federation interconnect links, no additional configuration of management controllers or other external communication and discovery mechanism is required. More specifically, no external configuration and discovery of service processor elements on the federated nodes is required to perform a compatibility check during system initialization. This will allow for immediate federated system initialization after making the physical connections between nodes such as by connecting the system fabric cables between enclosures.

A process of voting may be performed to arrive at a firmware version supported by at least a subset of the available nodes interconnected on the federated interface. In one embodiment, the process of voting may be limited to a single round of voting wherein each node broadcasts all supported firmware versions to the federated interface. The nodes then collectively select an optimal firmware version for initializing a federated system, such as the version supported by the largest number of nodes. Optionally, the logic for selecting the optimal firmware version may include considerations for deciding between two firmware versions that are supported by an equal number of nodes.

In another embodiment, the voting process may alternatively include a sequence of two or more voting rounds. In a first voting round, each node votes for the highest firmware version it supports. In each subsequent voting round, a node may change its vote based on the votes in the preceding round. In any given round wherein more than one firmware version received a vote, the highest firmware version and the next highest firmware version to each receive at least one vote may be determined. Each node that voted for the highest firmware version in the preceding voting round may change its vote to the next highest firmware version, and the votes of the other nodes are not changed. This process is performed iteratively until a final voting round in which none of the votes have changed. The primary federated system is then initialized from the nodes voting for the highest firmware version to receive votes in the final round. If all of the nodes voted unanimously in the final voting round, the system is initialized as a fully federated system. If the votes in the final voting round were not unanimous, one or more additional federated system may be initialized from another firmware version(s).

Nodes not participating in the primary federated system may alternatively be placed in a recovery/degraded mode of operation to receive a flash update.

Figure 1:
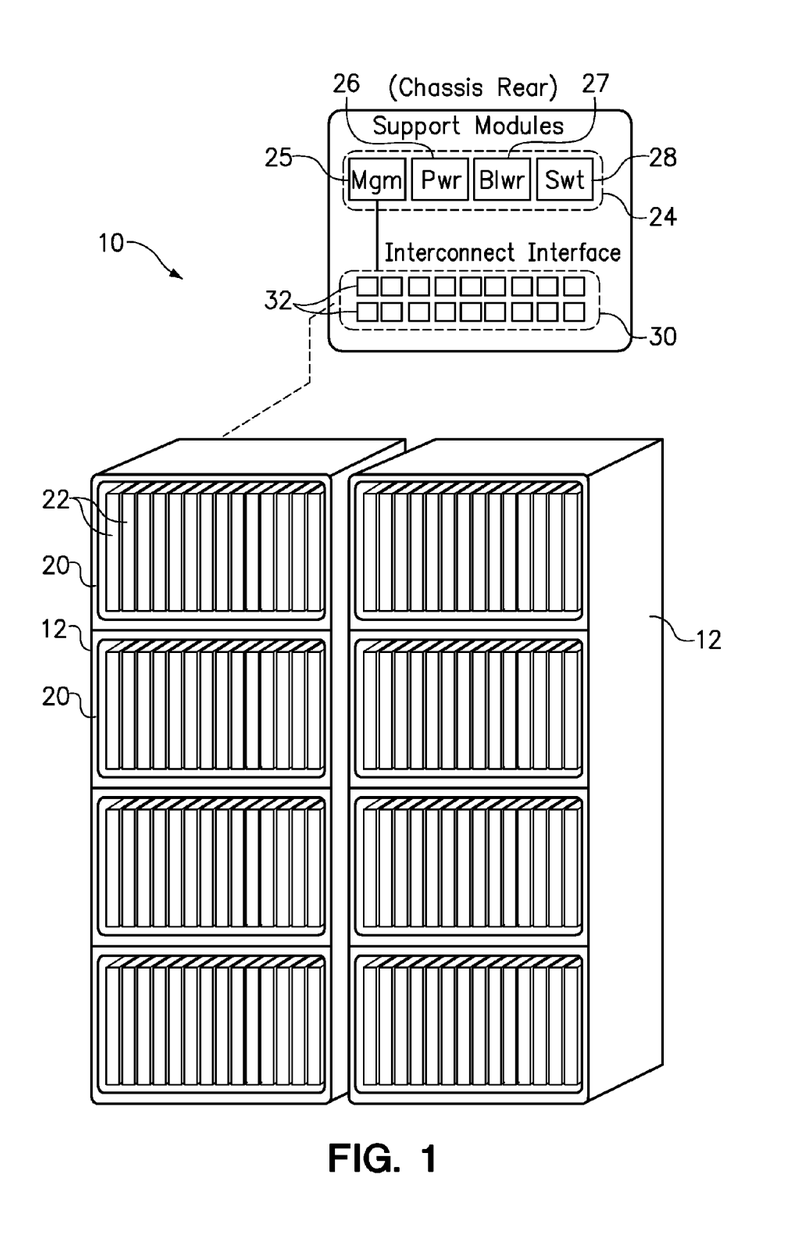
FIG. 1 is a perspective view of a multi-enclosure computer system that may be physically configured and initialized as a federated computer system.

FIG. 1 is a perspective view of a multi-enclosure computer system 10 that may be physically configured and initialized as a federated computer system according to the principles disclosed herein. By way of example, the computer system 10 in FIG. 1 includes a total of eight enclosures 20 mounted on two equipment racks 12 with four enclosures 20 per rack 12, and with each enclosure 20 receiving up to fourteen blade servers 22. As understood in the art, each enclosure 20 may include support modules 24 that provide shared resources to the servers within a given enclosure, such as one or more management module 25, power module 26, blower module 27, and switch module 28. The servers 22 and support modules 24 in each enclosure 20 may communicate electrical power and data signals internally within the enclosure over a midplane or backplane. The management module 25 may include a management processor and firmware to manage the enclosure 20, such as enforcing an enclosure power policy, monitoring temperatures, generating system alerts, and other enclosure-level systems management tasks. Each enclosure 20 also provides a physical interface 30, which may reside on the management module 25, with any number of physical connectors 32 for making functional connections between the server enclosures 20 using cables. The federated interface refers to the physical interfaces 30 of the nodes as connected by high-speed system fabric cables providing high-speed links between nodes.

During initialization, the enclosures 20 may communicate over the federated interface using a low-level wire protocol to share firmware version information over a signal path via the links between enclosures available prior to initializing the system. The wire protocol in a federated system is typically proprietary in nature, based upon the federation mechanism, which is also usually proprietary. The basic stages of initialization are for each node to initialize its hardware, then initialize the interconnect link to other nodes in order to discover the system topology. The initialization logic for the disclosed methods may reside in that topology discovery process. After the population of peers is determined, a signal to begin firmware signature voting would be broadcast to the federated interface. The voting would then proceed as a sequence of one or more voting rounds, with marker events to signal the beginning and end of each voting round. Finally, an end-of-voting broadcast would be used to move into the next phase of federated system initialization. The determination of enclosures having compatible firmware versions is used to establish a primary federated configuration for initializing.

Figure 2:
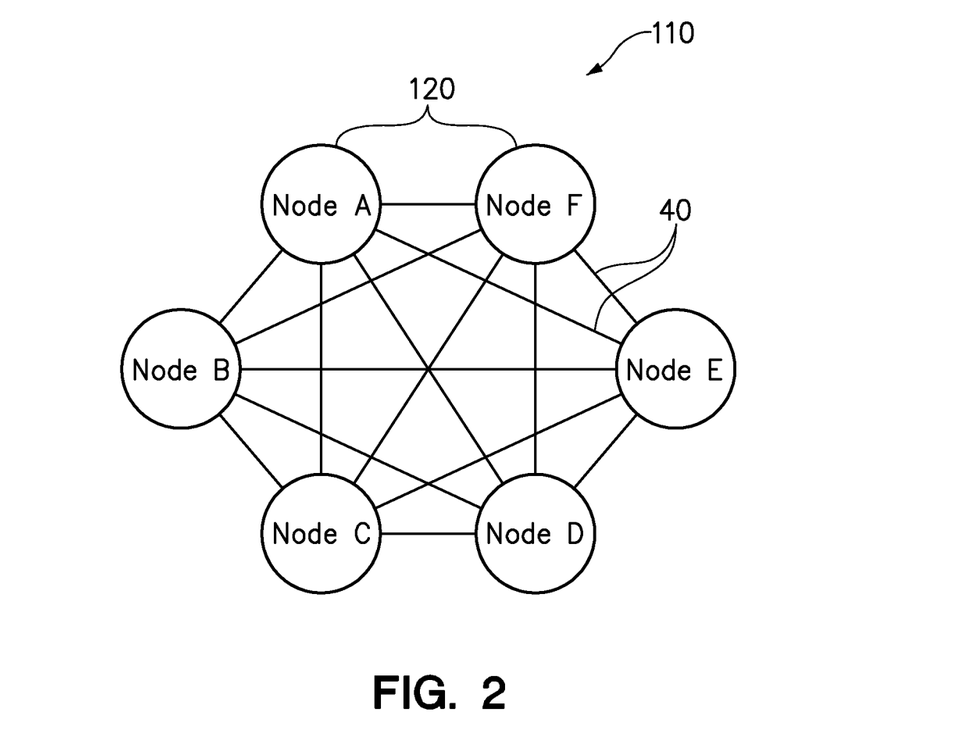
FIG. 2 is a schematic diagram of a computer system having six nodes interconnected by a fabric comprising high-speed links.

FIG. 2 is a schematic diagram of a computer system 110 having, by way of example, six nodes 120 (Node A-Node F) interconnected by a fabric comprising high-speed links 40. Since an enclosure may be configured as a single node, multiple nodes, or part of a node, there is no required relationship between the number of nodes and the number of enclosures in a system. Thus, the six-node system 110 of FIG. 2 may be achieved, for example, by applying a particular cabling configuration to the eight enclosures of the computer system 10 of FIG. 1. The nodes 120 are interconnected by and communicate over the high-speed links 40, which are functional connections that may be provided by high-speed system fabric cables. In this example, each node 120 is directly connected to every other node 120 in the system 110, such as using specific connectors 32 from the physical interface 30 (see FIG. 1).

Each node 120 may be operated according to initialization control logic, which coordinates with the other nodes 120 in the system 110 to collectively perform an initialization sequence of a federated system. The control logic would typically reside in the BIOS or its equivalent system firmware. Each node 120 may support more than one firmware version. For example, a particular node 120 may include a stored copy of the most current firmware update installed, along with stored copies of one or more previous versions of the same firmware. Additionally, a given firmware set may be capable of operating in multiple modes, with each mode matched to a different federated firmware set version. To properly initialize the system 110 as a federated system, the nodes 120 must have compatible (matching sets of) firmware. The firmware refers to all of the firmware elements that must be matched for federation to be supported. The initialization control logic allows the nodes 120 to broadcast their supported firmware versions to the federated interface.

The initialization control logic may attempt to achieve the largest-possible federated system by identifying a firmware version supported by the great number of nodes in the system 110. Since this communication between the nodes 120 happens prior the system being fully initialized, the nodes 120 can communicate over the links 40 of the system fabric using a low-level wire protocol, outside of any service processor elements. In one implementation, each node 120 broadcasts a "vote" for a candidate firmware version to the federated interface. The firmware version having the greatest number of votes when voting concludes may then be selected for operating the system 110 as a federated system. In an embodiment where one or more nodes supports more than one firmware version, the nodes may re-vote as necessary in a sequence of two or more voting rounds, to collectively determine a firmware version that will allow the greatest number of nodes 120 to participate in the federated system.

After the nodes 120 that will participate in a primary federated system have been determined, the remaining nodes 120 may repeat the process of identifying nodes with compatible firmware versions to form one or more additional federated systems from among those remaining nodes 120. Alternatively, those remaining nodes 120 that do not participate in the primary federated system may enter a degraded mode of operation wherein those nodes 120 operate independently. Those remaining nodes 120 may alternatively enter an automatic flash update sequence. For example, the flash update sequence may be used to update to the firmware version currently used by the nodes in the primary federated system.

By utilizing a low-level wire protocol on the federation interconnect links 40, no additional configuration of management controllers or other external communication and discovery mechanism is required. This will allow for immediate federated system initialization after connecting the system fabric cables between enclosures. That is, no external configuration and discovery of service processor elements on the federated nodes is required to perform a compatibility check during system initialization. Additionally, the system nodes not participating in the primary federation can be identified and sent into a flash update sequence per customer policy in an environment where the maximum federation is always desired.

In the example system 110 of FIG. 2, each node is connected to every other node. A special case would be when the nodes are not all connected to one another. The voting algorithm could then be modified based upon the inability of each node to receive the version information being broadcast by all other nodes. Such an implementation would be within the capabilities of one having ordinary skill in the art based on the methodology described herein. For example, one implementation would be for each node to decide whether to change its vote based on the votes that node is able to receive and read, even though the node may not know what all of the votes were in a particular round.

Figure 3:
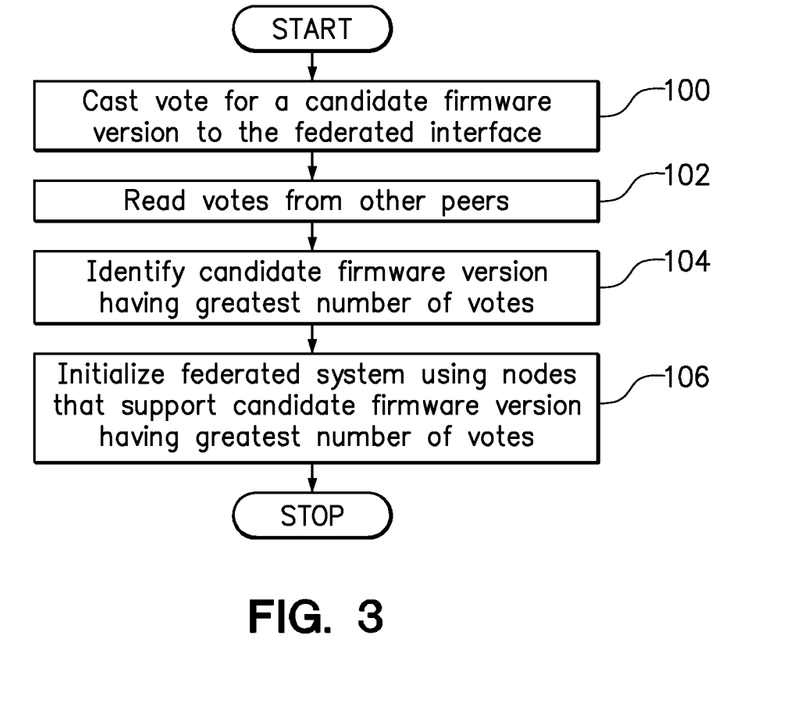
FIG. 3 is a flowchart generally outlining an example of a method for initializing a federated computer system.

FIG. 3 is a flowchart broadly outlining a method of initializing a federated computer system. The method may be implemented, for example, on a computer system having a plurality of enclosures interconnected as a fabric of nodes by a federated interface. Each chassis may comprise one or more nodes, or a portion of one node. The federated interface comprises high-speed links between the nodes, such as Scalable Coherent Interface (SCI) per IEEE Standard 1596-1992 and Intel QuickPath Interconnect (QPI). The nodes are preferably interconnected so that each node is connected to every other node. The method may be implemented on the computer system of FIGS. 1 and 2, for example. The flowchart outlines the method from the perspective of each node; that is, the method steps may be performed at each node to collectively determine which nodes will participate in the federated system. The nodes may collectively initialize as a federated system of nodes with compatible firmware versions, without the requirement of a separate controller to coordinate the nodes and without any additional external communication or user input.

Step 100 is for each node to cast a vote to the federated interface for a candidate firmware version supported by that node. The firmware version includes the aggregated input of all elements required to be matched at a compatible level in order for federation to be possible in the system. This may differ for various embodiments of the federated system, but typical examples include a node's BIOS or Unified Extensible Firmware Interface (UEFI) firmware, firmware for the high-speed interconnect, and node service processor firmware. Version information may be comprised of a list of individual firmware version elements or may be a hash of the elements to create a unique signature for each version set. A node supports a firmware version if that firmware version is currently installed on and operable from the node. The nodes may periodically receive firmware updates such as through a flash update sequence. In some cases, a node may support only the latest firmware version it has successfully received through a firmware update, and previous versions may be removed. In other cases, a node may support more than one firmware version, with the option to initialize with either the latest firmware version or a previous firmware version. In the latter case, each node may initially vote for the latest firmware version it currently supports. To cast a vote for a candidate firmware version, a node may generate a firmware signature. The signature can be a composite of hardware and software version information. In step 102, each node reads the votes of its peers on the federated interface. A node can read the vote of a particular peer by processing the firmware signature generated by that peer.

Step 104 is to identify a candidate firmware version having the greatest number of votes. Each node may store the votes of its peers in local memory in conjunction with step 102 so that each node may then independently determine the candidate firmware version with the greatest number of votes in step 104. Alternatively, a controller on the federated interface (but still separate from any service processor elements on the enclosures) may comprise memory for storing the votes and control logic for tallying the votes and communicate the results of the voting to the nodes. Any such controller on the federated interface may still be outside of any service processor elements on the nodes, allowing the voting process to occur even though the system has not yet been initialized.

Step 106 is to initialize a federated system using the nodes that support the candidate firmware having the greatest number of votes as determined in step 104. If the voting is unanimous, i.e. all nodes on the federated interface voted for the same firmware version, then the system may be initialized as a fully federated system. If the voting is not unanimous, a set of nodes may be identified that do not support the firmware version identified as receiving the greatest number of votes. A second federated system, alternately referred to as a sub-federation, may be initialized with a minority subset of nodes that support a firmware version other than the firmware version receiving the greatest number of votes. It is also possible for more than one candidate firmware version to be tied for receiving the greatest number of votes, in which case two identically-sized federated systems may be created and initialized. It may be observed that, in the broadly outlined method of FIG. 3, the nodes to be included in the federated system may be determined in as few as one voting round, whether or not the result of that single voting round is unanimous.

Figure 4:
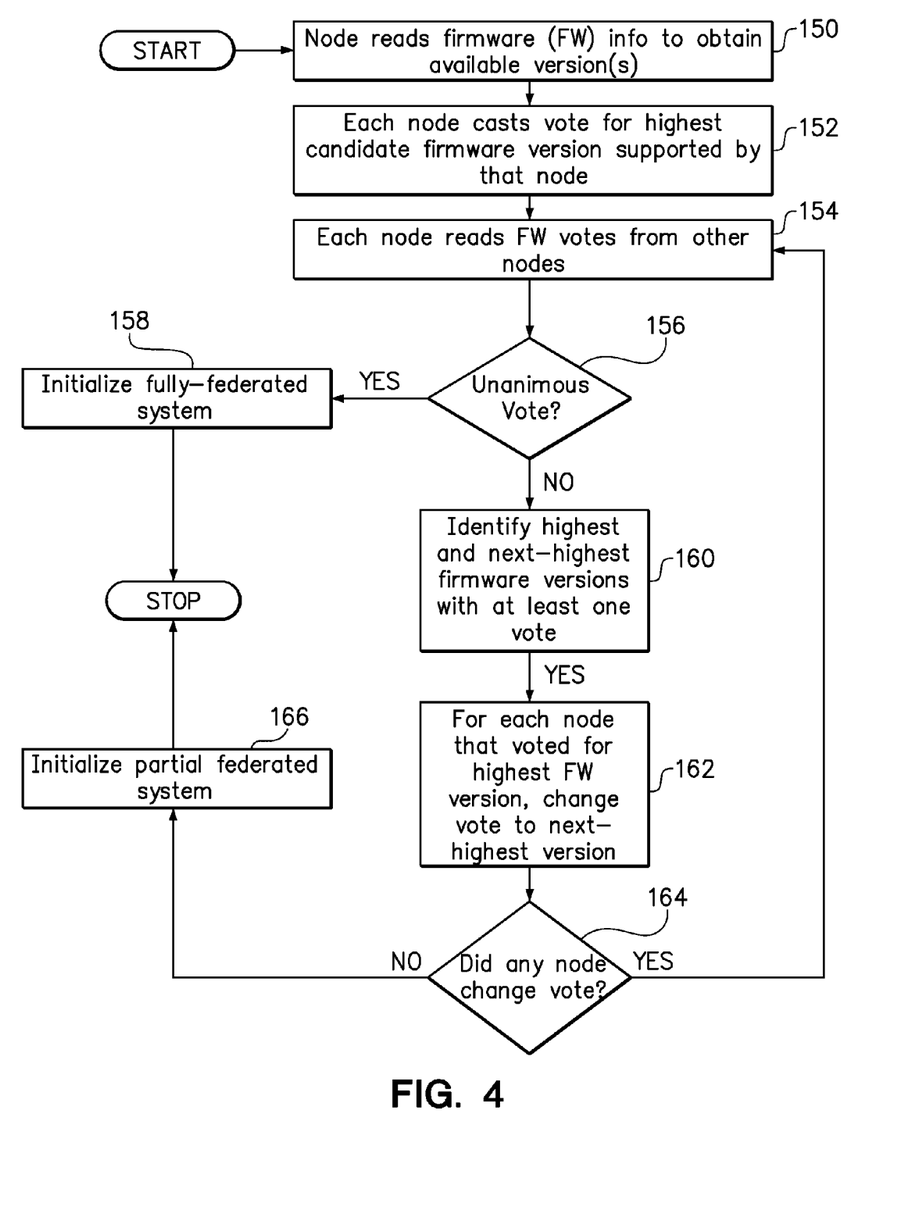
FIG. 4 is a flowchart outlining another method of initializing one or more federated systems from a fabric of interconnected nodes that support more than one firmware version.

FIG. 4 is a flowchart outlining another method wherein a sequence of voting rounds is performed to determine one or more federated systems from a fabric of interconnected nodes. The method of FIG. 4, like the method of FIG. 3, may be implemented on any computer system interconnected as a fabric of nodes by a federated interface. Again, the nodes may comprise one or more server enclosure per node, where each enclosure has one or more servers, and the nodes may be linked by high-speed system fabric cables, such as SCI or QPI. The nodes are preferably interconnected so that each node is connected to every other node. Each node may support a plurality of different firmware versions. The method of FIG. 4 may be implemented on the computer system of FIGS. 1 and 2, for example.

Step 150 is for each node to read its firmware (FW) information stored on the node. The firmware information provides a detailed description of the available firmware versions currently supported by that node. The firmware information may include program code for each of a plurality of hardware devices associated with that node. The firmware information may include identifying version information, such as an alphanumeric firmware number that describes the version. If a plurality of firmware versions are loaded on and currently supported by a node, the FW information may identify a chronology of release, such as the dates of their installation. The firmware versions have an established hierarchy, which may be based on this chronology. For example, in a hypothetical group of six different firmware versions A to F, firmware version F may be the highest firmware version and firmware version A may be the lowest firmware version. The hierarchy may be determined by the chronology, e.g., with version A being the earliest release and version F being the latest release. Version F is the highest firmware version, version E is the next-highest firmware version relative to version F, version D is the next-highest version relative to version E, and so forth.

Step 152 describes an initial voting round wherein each node casts a vote to the federated interface for the highest firmware version supported by that node. The vote to be cast may be embodied as a signature, which may be selected as a function of the firmware version generally. In one implementation, the signature may be a composite of hardware and software version information. The signature can also be a mathematical hash of version information. For example, in one embodiment, an algorithm would map all sub-versions of hardware and firmware to "buckets" of interoperability, i.e. where each bucket represents one interoperable combination of hardware and firmware sub-versions. Then the buckets would be combined, such as using a logical OR, to form the signature which is used to determine compatibility between firmware sets. The interpretation of the hash results would need to be pre-defined in the node firmware. The vote may be an electronic representation of the firmware signature that is transmitted over the federated interface so that the signature can be read by the other nodes interconnected within the fabric.

Step 154 is for each node to read the current votes of the other nodes in the fabric, i.e. its peers. Each node casts its vote for a preferred firmware version to the federated interface in step 152, and each node in the fabric receives the votes of its peers over the federated interface. By having each node directly connected to every other node in the fabric, each node may directly receive and compare the votes from its peers. The votes from the nodes may be temporarily stored in volatile memory for purpose of comparison.

Conditional step 156 is embedded in a flowchart loop and determines whether the most recent round of voting was unanimous, which may be determined by comparing signatures. This step may be performed independently by each node, without the requirement of a separate controller to coordinate the nodes and without any additional external communication or user input. The vote may be deemed unanimous if every node voted for the same candidate firmware version, which is indicated if the signatures from all of the nodes are identical. If the most recent round of voting for a candidate firmware version was unanimous per conditional step 156, then a fully-federated system is initialized per step 158. A fully-federated system in this context is a federated system in which all of the nodes in the fabric participate. It is possible for the votes to be unanimous on the first (and therefore last) voting round, in which case only one voting round will occur prior to initialization. It is alternatively possible to converge to a unanimous vote after multiple iterations of a flowchart loop that returns to steps 154-156 with each iteration.

If the most recent voting round for a candidate firmware version is not unanimous per conditional step 156, that implies that more than one firmware version received a vote. Step 160 is to determine the highest and next-highest firmware versions to each receive at least one vote in the most recent voting round. According to step 162, each node that voted for the highest firmware version to have received a vote in the most recent voting round changes its vote to the next-highest firmware version to have received a vote in the most recent voting round. All other nodes will not change their votes. If any node changes its vote in step 162 then step 162 represents a voting round that reflects any changed votes.

Conditional step 164 is to determine whether any nodes changed their votes in step 162. If one or more votes changed per conditional step 164, then the changed vote represents another voting round, and the method returns to step 154 whereby each node again reads the votes of the other nodes in the most recent round of voting, and another check for a unanimous vote is performed per conditional step 156. Alternatively, if no votes changed in conditional step 164 then the most recent voting round is considered the final voting round, and each node may output an "end of vote" signal to the federated interface. A partially-federated system is then initialized in step 166. The partially-federated system includes fewer than all of the nodes interconnected on the federated interface, since the votes in the final voting round were not unanimous. The partially-federated system is formed from the nodes that support the highest firmware version to have received votes in the final voting round.

Figure 5:
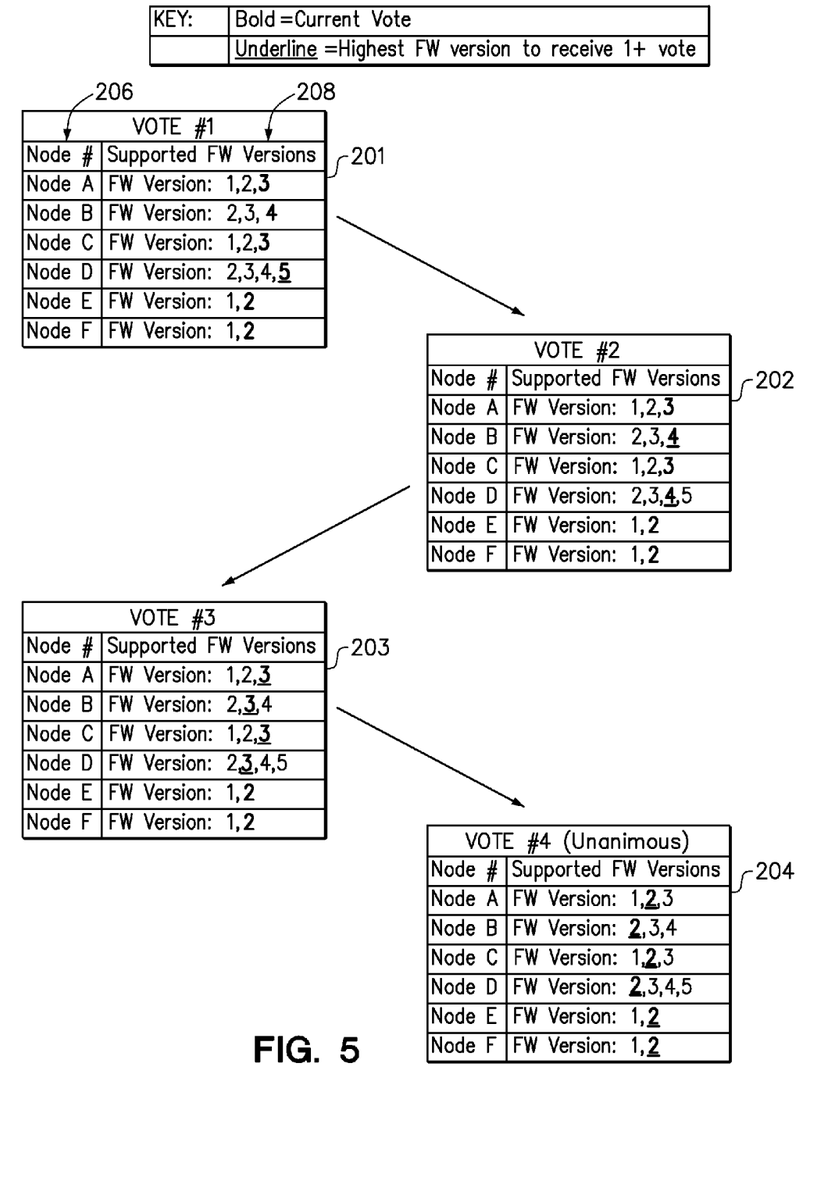
FIG. 5 is a diagram providing two examples of iterative voting in a hypothetical six-node system.

FIG. 5 is a diagram providing a sequence of voting rounds in the hypothetical six-node system of FIG. 2. Sample voting results are provided in charts 201, 202, 203, 204 corresponding to a sequence of four voting rounds. In each chart 201-204, a first column 206 identifies the six nodes by a letter designation (Nodes A-F). A second column 208 contains numerical designations for the firmware version(s) currently supported by the nodes. Each row thereby associates a node with the firmware versions that nodes supports. Basic integer designations are used for the firmware versions to simplify discussion, although more elaborate alphanumeric designations may be used to represent firmware versions or signatures derived from firmware versions. The firmware versions range from FW version 1 to FW version 5 in this example. Node A supports FW versions 1-3; Node B supports FW versions 2-4, Node C supports FW versions 1-3, Node D supports FW versions 2-5, and Nodes E and F each support FW versions 1-2 only. After each voting round, the current vote of each node is indicated using a bold font for the version number, and the highest version to receive at least one vote is underlined. Collectively, the nodes may seek to form a federated system with as many nodes as possible. All six nodes may participate in a federated system if the nodes can collectively determine a matching or compatible firmware version supported by all six nodes.

An initial voting round (Vote #1) is summarized in the first chart 201. Each node initially votes for the highest firmware version it supports. FW version 5 is the highest version to receive at least one vote, and FW version 4 is the next-highest FW version to receive at least one vote. Node D was the only node to vote for FW version 5 in the initial voting round, so in the second round of voting (chart 202), Node D changes its vote from FW version 5 to FW version 4. No other node changes its vote in the second voting round.

When the second voting round is complete, the highest FW version to receive at least one vote is FW version 4 (Nodes B and D). The next-highest FW version to receive at least one vote is FW version 3. Nodes B and D change their votes from FW version 4 to FW version 3 in the third round of voting (chart 203).

When the third voting round is complete, the highest FW version to receive at least one vote is now FW version 3 (Nodes A-D). The next-highest FW version to receive at least one vote is FW version 2. Nodes A-D all support FW version 2, so in the fourth and final voting round (chart 204), Nodes A-D all change their votes from FW version 3 to FW version 2. The votes are unanimous, and no further voting rounds are needed. The system may now initialize as a fully-federated system with all six nodes A-F.

In this example, the voting desirably converged to a unanimous vote, meaning that a matching set of firmware supported by all the nodes on the federated interface was identified. Thus, a fully-federated system was achieved. If the sequence of voting did not arrive at a unanimous vote, then one or more federated systems could have been initialized from subsets of nodes, wherein each subset supports the same FW version as its peers in that subset. Thus, in another example, if Nodes A-D supported FW version 3 but not FW version 2, then a primary federation of Nodes A-D could have been initialized using Nodes A-D according to FW version 3, and a secondary federation could have been initialized using Nodes E-F according to FW version 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of initializing a federated computer system from a fabric of nodes connected by a federated interface, the method comprising:
performing a sequence of voting rounds wherein each node casts a vote to the federated interface for a candidate firmware version supported by that node;
in each voting round, determining a highest firmware version and a next highest firmware version to receive at least one of the votes;
each node that voted for the highest firmware version to receive at least one of the votes, and that supports the next highest firmware version, changing its vote to the next highest firmware version in a next voting round;
identifying the candidate firmware version having received the greatest number of votes; and
upon a conclusion of voting, initializing a federated system with the nodes that support the firmware version identified as having received the greatest number of votes.

2. The method of claim 1, wherein the step of each node casting a vote comprises:
each node generating a firmware signature as a composite of a hardware and software version information and communicating the firmware signature to the federated interface.

3. The method of claim 1, wherein the sequence of voting rounds continues to a final voting round in which the votes do not change.

4. The method of claim 1, further comprising:
the sequence of voting rounds including an initial voting round, wherein each node initially casts a vote to the federated interface for a highest firmware version supported by that node.

5. The method of claim 1, further comprising:
identifying a minority set of nodes that do not support the firmware version identified as receiving the greatest number of votes; and
initializing a second federated system with the minority set of nodes.

6. The method of claim 1, further comprising:
identifying a minority set of nodes that do not support the firmware version identified as receiving the greatest number of votes; and
initializing the minority set of the nodes in a non-federated mode of operation.

7. The method of claim 6, further comprising:
automatically entering a flash update sequence in the minority set of the nodes in the non-federated mode of operation.

8. The method of claim 1, further comprising:
identifying a first subset of the nodes that unanimously voted for the candidate firmware version having received the greatest number of votes and a second subset of the nodes that unanimously voted for another candidate firmware version; and
initializing a first sub-federation from the first subset of the nodes and a second sub-federation from the second subset of the nodes.

9. The method of claim 1, further comprising:
   determining the conclusion of voting when every node has published an end-of-vote signal on the federated interface.

10. The method of claim 1, wherein each node is a server.

11. The method of claim 1, wherein the federated interface includes high-speed links providing functional connections between nodes so that each node in the federated system is directly connected to every other node in the federated system.

12. A computer program product including computer usable program code stored on a non-transitory computer readable storage medium for initializing a federated computer system from a fabric of nodes connected by a federated interface, the computer program product including:
   computer usable program code for performing a sequence of voting rounds wherein each node casts a vote to the federated interface for a candidate firmware version supported by that node;
   computer usable program code for, in each voting round, determining a highest firmware version and a next highest firmware version to receive at least one of the votes;
   computer usable program code for causing each node that voted for the highest firmware version to receive at least one of the votes, and that supports the next highest firmware version, to change its vote to the next highest firmware version in a next voting round;
   computer usable program code for identifying the candidate firmware version having received the greatest number of votes; and
   computer usable program code for, upon a conclusion of voting, initializing a federated system with the nodes that support the firmware version identified as having received the greatest number of votes.

13. The computer program product of claim 12, wherein the computer usable program code for causing each node to cast a vote comprises:
   computer usable program code for causing each node to generate a firmware signature as a composite of a hardware and software version information and communicating the firmware signature to the federated interface.

14. The computer program product of claim 12, further comprising:
   computer usable program code for identifying a minority set of nodes that do not support the firmware version identified as receiving the greatest number of votes; and
   computer usable program code for initializing a second federated system with the minority set of nodes.

15. The computer program product of claim 12, further comprising:
   computer usable program code for identifying a minority set of nodes that do not support the firmware version identified as receiving the greatest number of votes; and
   computer usable program code for initializing the minority set of the nodes in a non-federated mode of operation.

16. The computer program product of claim 15, further comprising:
   computer usable program code for automatically entering a flash update sequence in the minority set of the nodes in the non-federated mode of operation.

17. The computer program product of claim 12, further comprising:
   computer usable program code for identifying a first subset of the nodes that unanimously voted for the candidate firmware version having received the greatest number of votes and a second subset of the nodes that unanimously voted for another candidate firmware version; and
   computer usable program code for initializing a first sub-federation from the first subset of the nodes and a second sub-federation from the second subset of the nodes.

18. The computer program product of claim 12, wherein each node is a server.

\* \* \* \* \*